United States Patent Office 3,254,129
Patented May 31, 1966

3,254,129
OPTICALLY ACTIVE ORGANOBORANES
Herbert C. Brown, 1840 Garden St., West Lafayette, Ind.
No Drawing. Filed Jan. 17, 1961, Ser. No. 83,140
15 Claims. (Cl. 260—606.5)

The present invention is concerned with novel processing and products, particularly involving optically active organoboranes.

Many methods for the preparation of organoboranes have been known for some time. The most common method for synthesizing the organoboranes has been the treatment of a boron halide or borate ester with a Grignard reagent. However, the Grignard reagents prepared from optically active halides, such as 2-bromobutane, racemize completely to inactive derivatives. The organoboranes formed via these Grignard reagents are also optically inactive.

More recently, organoboranes have been prepared by reacting diborane with olefins, especially in liquid systems or ether solvents, providing a more convenient synthesis for the mono-, di-, and trialkylboranes. For example, when 2-butene, 3-hexene, or norbornene are reacted with diborane, tris-2-butylborane, tri-3-hexylborane, and tris-2-norbornylborane are obtained in excellent yield. However, in accordance with well known principles of chemistry, the addition of the olefin proceeds equally well from both possible directions so that two enantimorphic alkyl groups are synthesized and attached to the boron in equal amounts and the products are completely optically inactive and in turn cannot be used to synthesize optically active derivatives.

The prior art procedures for obtaining optically active compounds involve many tedious process operations of recrystallizations and the like with optically active acids or bases to obtain the desired optically active product. Therefore, it is highly desirable to provide a more effective and efficient means for obtaining optically active products, including optically active organoboranes.

An object of this invention is to provide a method for the production of optically active organoboron products. Another object is to provide a new and novel process for the selective production of optically active organoboranes. A still further object is to provide, as new compositions, novel optically active organoboron products. These and other objects of the present invention will be evident as the discussion proceeds.

It has now been discovered that specific optically active organoboranes in a high state of optical purity can be obtained by reacting in optically active organoboron hydride with an olefinic material in which at least one of the carbon atoms becomes asymmetric upon bonding to the boron. The process is particularly applicable to the use of optically active organoboron hydrides in which at least one of the organo groups has an asymmetric carbon atom or is otherwise asymmetric. The reaction is preferably conducted at temperatures between about 0 to 50° C. Advantage can also be achieved by faster reaction rates when employing certain catalysts, especially ethers such as the glycol ethers. Thus, a particular embodiment of the invention comprises the reaction of optically active di-α-pinyl boron hydride (derived from optically active α-pinene and diborane) with cis-2-butene in the presence of the dimethyl ether of diethylene glycol at room temperature to produce di-α-pinyl-sec-butylborane in which the sec-butyl group is also optically active. As will be brought forth in more detail hereinafter, the products produced according to this invention can be directly converted to derivatives thereof, such as the alcohols, in which the specific optical activity is unexpectedly retained. Other embodiments of the invention will be apparent as the discussion proceeds.

The present invention is of particular advantage in providing unique optically active organoborane products. These products in turn are quite valuable since they can be readily converted to optically active derivatives. Thus, one can produce, for example, an optically active alcohol without the very tedious and laborious formation of derivatives, followed by recrystallizations, and the like required by the previously known prior art procedures. Other advantages of the present invention will be apparent as the discussion proceeds.

The present invention will be more readily understood from the following examples.

Example I

In a 250 ml. flask fitted with a magnetic stirrer and dropping funnel was placed 0.200 mole of d-α-pinene ($[\alpha]_D^{20} = +46°$), 0.075 mole of sodium borohydride and 100 ml. of diglyme. The flask was flushed with nitrogen and through the dropping funnel was added 0.100 mole of boron trifluoride-ethyl etherate over a period of 1 hour. To the resulting action mixture containing the optically active di-α-pinyl boron hydride in suspension was added 0.100 mole of cis-2-butene and the mixture was permitted to stand overnight. The solid di-α-pinyl boron hydride disappeared as it reacted to form di-α-pinyl-sec-butylborane, soluble in the diglyme.

To show that the new sec-butylboron grouping was optically active, the product was oxidized with alkaline hydrogen peroxide and distilled. There was obtained an 80 percent yield of 1-2-butanol, B.P. 98° at 744 mm., $n_D^{20}$ 1.3975, $[\alpha]_D^{20}$ −11.8°. This compares with the highest reported rotation for this compound of −13.5° reported by Lerou and Lucas, J. Am. Chem. Soc., 73, 41 (1951).

If l-α-pinene is used in place of d-α-pinene in the above example, then d-2-butanol is produced.

Example II

Employing the procedure of Example I, cis-3-hexene was reacted with the optically active di-α-pinyl boron hydride and the di-α-pinyl-3-hexylborane produced converted to 3-hexanol. The 3-hexanol had a boiling point of 135 to 136° C., $n_D^{20}$ 1.4148, $[\alpha]_D^{20}$ −6.5° The yield obtained was 80 percent. The rotation of the product compares with the highest value recorded for this compound in the literature, $[\alpha]_D^{20}$ −7.3, J. Kenyon and R. Poplett, J. Chem. Soc., 1945, 273.

Example III

Again employing the procedure of Example I, the optically active di-α-pinyl boron hydride was reacted with norbornene and the product oxidized to recover the exo-norborneol which had a melting point of 125 to 126°, $[\alpha]_D^{20}$ −2.0°, acetate $[\alpha]_D^{20}$ +7.9°, as compared to the literature values, M.P. 126–126.8°, $[\alpha]_D^{20}$ −2.41°, acetate, +10.4°, from S. Winstein and D. Trifan, J. Am. Chem. Soc., 74, 1154 (1952).

The above examples pointedly illustrate the uniqueness of the present invention in illustrating that optical activity can be induced and retained, for example, in the subsequent conversion to the alcohols without the laborious resolutions required by the prior art techniques. Further, it is evident that even higher rotations for the induced asymmetry would be obtained using a more pure α-pinene rather than the commercial product employed in the above examples which had a specific rotation of +46° as compared to the highest value reported in the literature for this compound of $[\alpha]_D^{20}$ +57°. The rotations observed in the above reactions are lower than those recorded for the pure alcohols by a fraction which is almost identical with the ratio of 46/57 which is the ratio of the rotations of the commercial α-pinene to the purest material reported in the literature.

The organoborane employed as a reactant in the process of the present invention is an optically active organoboron hydride or its dimer, that is, a compound which has only organo groups, boron, and hydrogen, and in which at least one of the organo groups has an asymmetric carbon atom (or is otherwise asymmetric), preferably but not necessarily derived from an optically active olefinic material and diborane. This is the prime requisite of this reagent and it will be evident that diorganoboron hydrides, organoboron dihydrides, and cyclic organoboron hydrides are included wherein various functional groups can be attached to the carbon atoms of the organo group which are preferably unreactive in the system. These organoboron hydrides can be obtained, for example, by the methods of hydroboration of an optically active olefin compound (e.g. a compound having at least one carbon to carbon double bond and at least one asymmetric carbon atom elsewhere in the molecule) with diborane or other procedures now well known and as described, for example, in my co-pending applications S.N. 680,933, now abandoned, and 680,934, filed August 29, 1957, and issued Patents 2,925,441, 2,925,438, and 2,925,437, all issued on February 16, 1960, among others. Other methods for obtaining the optically active organoboron hydride can also be used, however. Thus, typical examples of the optically active organoboron hydride reagent include optically active α-pinyl boron dihydride, di-α-pinyl diborane, di-β-pinyl boron hydride, β-pinyl boron dihydride, camphyl boron dihydride, dicamphyl boron hydride, cholestyl boron dihydride, dicholestyl boron hydride, diquinyl boron hydride, and the like optically active organoboron hydrides having the representative structure

wherein R is R*, an organo group or hydrogen, and R* is an optically active organo group having at least one asymmetric carbon atom. It is also possible to utilize optically active dienes such as d-limonene, phellandrene, caryophylene, etc. to synthesize the optically active organoboron hydride reagent, e.g. from diborane. In these compounds the organoboron hydride will contain the organic group in the ratio of 1 diene to 1 boron as contrasted to the ratio 2 to 1 for the compounds previously discussed. These compounds will have the representative structure:

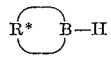

For example, such compounds derived from diborane reacting with d-limonene, camphene, caryophylene, and the like.

It is to be understood that either the dextro or levo rotatory forms of the above optically active oragnoboron hydrides can be employed. Particularly preferred embodiments of the optically active organoboron hydride comprise di-α-pinyl boron hydride and di-β-pinyl boron hydride because of their easier preparation, availability, and low cost.

The olefinic materials which are employed are, in general, materials which have a double bond between two carbon atoms, one of which upon attachment to the boron according to the reaction of the present invention, becomes an asymmetric carbon atom. Thus, the only requisite of such olefinic materials is that the doubly bonded carbon atom to which the boron becomes attached must then have three different chemical groups attached thereto. Such chemical groups can be organic or inorganic so long as they are different from each other. Likewise, it is preferable that such groups be essentially inert to the organoboron hydride reagent although it is to be understood that appropriate adjustment of stoichiometry can be made to compensate for any reactivity of such groups, if desired. Thus, such groups can be the typical hydrocarbons, functionally substituted hydrocarbons, or functional groups, such as the halogens, amino, ether linkages, nitro groups, and the like. Accordingly, typical examples of the olefinic materials employed in the process of this invention include the following:

Trans-2-butene,
2-pentene,
2-methyl-1-butene,
2-methyl-2-butene,
2-methyl-1-pentene,
2-methyl-2-pentene,
3-methyl-2-pentene,
2-hexene,
2-heptene,
2-octene,
2-decene,
2,2,4-trimethyl-1-pentene,
α-Methylstyrene,
Cis-phenylmethylethylene,
Cis-stilbene,
1-methylcyclopentene,
1-methylcyclohexene,
$\Delta^3$-p-menthene,
3-hexenoic ethyl ester,
Crotylmethyl ether,
Ethyl oleate,
Bicycloheptadiene,
(p-Nitrophenyl)-propene,
(p-Carbethoxyphenyl)-propene,
Phenylpropene,
(2-methylphenyl)-propene,
Methylmethacrylate,
(m-Nitrophenyl)-propene,
(α-Methylphenyl)-propene,
Crotonaldehyde,
1-nitrobutene-2,
Crotylethyl ether,
Crotylbutyl ether,
Cholestenes,
Steriods, such as
Cholesterol,
Cholestenone,
Erogosterol,
Stigmasterol,
Testosterone,
Cortisone,
Stilbesterol, and the like; alkaloids, as for example, myosmine, galipine, leucenol, aborine, berberine, sinomenine, and codeine, and the like. Thus, the term "olefinic organic compound" also includes nitro olefins, halo olefins (e.g. allyl chloride, crotyl chloride, etc.) olefinic ethers such as the alkenyl alkyl ethers, olefinic acid chlorides, olefinic carboxylic esters (e.g. alkyl esters of alkenyl carboxylic acids such as ethyl oleate), olefinic borate esters, etc. In general, such olefinic materials will have up to about 40 carbon atoms and higher. The olefins in which the double bond is internal, that is both doubly bonded atoms are non-terminal are preferred.

Thus, by the process of this invention, highly unique and novel products are obtained which have at least two different optically active organic groups attached to boron, at least one of which is attached to boron by an asymmetric carbon atom and from which derivatives, such as the alcohols and the like, can be obtained in which the optical activity is retained. By the above described organoboron hydrides and others reacting with the olefinic materials one obtains, for example, the novel products: optically active Di-α-pinyl-2-methyl-2-butylborane,
Di-β-pinyl-2-heptylborane,
Dinorbornyl-1-methylcyclohexylborane,
Di-α-pinyl-3-menthylborane,
α-pinyl-di(3-menthyl)borane,
Di(α-pinyl)-5-cholestylborane,
Dicamphyl-2-hexylborane,
Dicholestyl-2-octylborane,
Di-α-pinyl-2-butylborane,
Di-α-pinyl-3-butylborane,
Di-α-pinyl-4-octylborane,
Di-α-pinyl-2-norbornylborane,
Di-α-pinyl-2-methyl-1-butylborane,
Di-α-pinyl-3-methyl-2-butylborane,
Di-α-pinyl-2-methylcyclopentylborane,
Di-α-pinyl-3-methylcyclopentylborane,
Di-α-pinyl-2-methylcyclohexylborane,
Di-β-pinyl-2-butylborane,
Dicamphyl-2-norbornylborane, and the like.

The temperature at which the process of this invention is conducted is subject to considerable latitude. In general, temperatures between about 0 to 100° C. are employed. Best results are obtained at temperatures between 0 to 50° C. with, if necessary, sufficient pressure to initially have present a liquid phase system. The process can also be conducted in the presence of various inert solvents, if desired, such as the hydrocarbons or a pre-formed portion of the organoboron product.

A particularly effective method to conduct the process of this invention is to employ certain materials which catalyze the reaction of the olefinic material with the optically active organoboron hydride. To illustrate the type of materials which may be used as catalysts, the following list is offered, but it is to be understood that the list is illustrative only and is not to be construed as limiting:

(A) Ethers, particularly saturated ethers such as the alkyl ethers, e.g. ethyl ether, diglyme

diisopropyl ether, diamyl ether, diethyl ether of diethylene glycol, dimethoxyethane, and the like; saturated cyclic ethers such as tetrahydrofuran, dioxane, etc.; and aromatic ethers such as anisole, phenetole, and the like.

(B) Organic esters such as alkyl esters of alkanoic acids or aromatic acids, e.g. ethyl acetate, ethyl benzoate.

(C) Inorganic esters such as the alkyl borates and silicates, e.g. trimethyl borate [B(OCH$_3$)$_3$], triethyl borate, triisopropyl borate, ethyl silicate.

(D) Sulfur derivatives such as the alkyl sulfides and sulfones, e.g. ethyl sulfide, methyl ethyl sulfide, diethyl sulfone, tetrahydrothiophene.

(E) Nitro derivatives such as the nitro alkyl and nitro aryl compounds, e.g., nitromethane, nitrobenzene.

As can be seen from the above list, the materials which can be used as catalysts in the present invention are weak donor molecules or weak Lewis bases which are capable of forming unstable complexes or addition compounds with Lewis acids such as diborane and boron fluoride. While any Group VI atom could be present in the weakly basic organic compound catalyst, preferably the catalyst will contain oxygen or sulfur. Even water or alcohols can be used as a catalyst, but they react with diborane to form boric acid or boric acid esters and hydrogen and thus involve a loss of diborane.

The proportion of the reagents employed is subject to some latitude, but in general is dependent upon the number of BH bonds in the organoboron hydride. Ordinarily, at least one mole of the olefinic compound for each B—H bonding in the organoboron hydride is employed. Excess amounts can, of course, be employed and recycling effected, if desired, although excesses above about 10 percent generally are not practical.

The following examples will illustrate additional embodiments of the present invention.

*Example IV*

Di-β-pinyl boron hydride is obtained by adding 4 moles of optically active β-pinene to 1 mole of diborane in tetrahydrofuran at room temperature for about 1 hour. Then, essentially 2 moles of trans-2-butene is added to the mixture and reaction continued for about 1 hour. In this manner, di-β-pinyl-2-butylborane is obtained in good yield having optical activity which, upon oxidation according to the procedure of Example I, results in the highly optically active 2-butanol.

Similar results are obtained when the above is repeated substituting 2-pentene, 2-methyl-2-pentene, 2-octene, and the like olefinic materials for trans-2-butene.

*Example V*

Optically active camphyl boron dihydride is reacted with ethyl oleate in slight excess in the presence of tetrahydrofuran as a solvent and catalyst. The corresponding hydroborated product is obtained having a high optical activity which, upon oxidizing, results in the respective alcohols of ethyl oleate and camphene.

*Example VI*

One mole of the optically active di-α-pinyl boron hydride produced as in Example I is reacted with essentially 1 mole of Δ$^3$-p-menthene at 50° C. for one hour employing the dimethyl ether of diethylene glycol as solvent. In this manner, di-α-pinyl-3-p-menthyl borane is obtained. Upon oxidation as in Example I and sepaartion of the alcohols formed by distillation, optically active menthol is obtained in good yield.

Similar results are obtained when di-β-pinyl boron hydride, dicamphyl boron hydride, caryophylyl boron hydride and the like optically active organoboron hydrides are substituted for the di-α-pinyl boron hydride in the above example.

*Example VII*

Essentially 1 mole of optically active di-β-pinyl boron hydride obtained as described in Example IV is reacted with essentially 1 mole of Δ$^5$-cholestene at 75° C. employing tetrahydropyran as solvent and catalyst for about 1 hour. At the end of this period, the reaction mixture is oxidized and distilled as in Example I whereby optically active 6-cholestanol is obtained in high yield and purity.

*Example VIII*

When essentially equimolar amounts of d-limonyl boron hydride are reacted with 1-methylcyclohexene at room temperature in the presence of diethyl ether and then the reaction mixture is oxidized and distilled as in Example I, optically active 2-methylcyclohexanol is obtained.

When any of the above examples are repeated employing other solvents, especially the catalytic materials such as diamyl ether, dioxane, anisole, ethyl acetate, trimethyl borate, ethyl sulfide, or nitrobenzene, equally satisfactory results are obtained.

*Example IX*

Essentially equimolar amounts of optically active di-α-pinyl boron hydride obtained as in Example I and 1-(p-chlorophenyl)-propene are reacted at room temperature in the presence of the dimethyl ether of diethylene glycol for 2 hours and the reaction mixture is oxidized and distilled as in Example I, optically active (1-p-chlorophenyl)-1-propanol is obtained along with isopinylcampheol, the corresponding alcohol of α-pinene.

When the above example is repeated substituting 3-methyl-2-pentene, 2-heptene, 3-hexenoic ethyl ester, bicycloheptadiene, cholesterol, cortisone, or aborine for (p- chlorophenyl)-propene in the above example, the corresponding optically active organoboranes are obtained from which on oxidation the corresponding optically active alcohols are produced.

The above examples have been presented by way of illustration and it is not intended that it be limited thereto. It will now be evident that other optically active organoboron hydrides, olefins, solvents and catalysts, and reaction conditions can be employed.

The examples have illustrated primarily one utility of the products of this invention, namely their oxidation, particularly into optically active alcohols. It is to be understood that other methods for performing the oxidation of the boron to carbon bonds are employable. For example, one highly effective method for accomplishing the oxidation is to react the optically active organoboron compound produced with oxygen or in the presence of either hydrocarbon amines, especially tertiary amines or ammonia. This reaction is generally conducted at temperatures between about 0 to 150° C. and can even be conducted in the further presence of water thereby producing the alcohol directly rather than going through the intermediate borate ester. Other methods for accomplishing the oxidation will now be evident.

Another embodiment of this invention comprises the regeneration of the optically active organoboron hydride reagent and removal of the new optically active group by treating the hydroboration product with diborane. This transfers the new grouping to diborane without loss of activity regenerating the initial reagent. For this purpose, essentially ½ mole of diborane per mole of new optically active group resulting from the hydroboration reaction is employed with the conditions being essentially as described above. By way of example, in Example I, after the di-α-pinyl boron hydride has been reacted with the cis-2-butene to form di-α-pinyl-2-butyl borane, it is then reacted with ½ mole of diborane to produce di-α-pinyl boron hydride and 2-butyl boron dihydride which are separated by conventional techniques. The 2-butyl boron hydride can then be oxidized as described above to produce optically active 2-butanol with the optically active di-α-pinyl boron hydride recycled for further reaction with cis-2-butene. It will now be evident that such a procedure can be employed in any of the above examples by appropriate modification.

In addition to the above uses of the novel optically active triorganoboranes of the present invention, they can be employed as alkylating agents for producing other metal alkyls by reacting with various metal salts, such as mercury, tin, or lead salts. They can also be isomerized by known procedures to produce various isomers thereof, if desired. Still other uses of the products of this invention will now be evident.

Having thus described the process of this invention, and the novel products produced thereby, it is not intended that it be limited except as set forth in the following claims.

I claim:
1. A process for the production of optically active organoboranes which comprises reacting (1) an optically active organo boron hydride in which each organo group is selected from the group consisting of unsubstituted hydrocarbon groups and functionally substituted hydrocarbon groups in which the functional substituents are non-reactive to the boron-hydrogen bond with (2) an olefinic compound in which at least one of the carbon atoms becomes asymmetric upon bonding to the boron.
2. An optically active triorganoborane in which there are at least two different optically active organo groups attached to the boron such that one of said groups has a different carbon skeleton from another of said groups, and in which the boron is directly attached to an asymmetric carbon atom of at least one of said groups.
3. The composition of claim 2 further characterized in that said optically active triorganoborane contains two optically active α-pinyl groups.
4. The composition of claim 2 further characterized in that said optically active triorganoborane contains two optically active β-pinyl groups.
5. The process of claim 1 further characterized in that it is conducted at a temperature of from about 0 to about 100° C.
6. The process of claim 1 further characterized in that it is conducted in the liquid phase at a temperature of from about 0 to about 100° C.
7. The process of claim 1 further characterized in that the reaction is conducted at a temperature of from about 0 to about 100° C. and a weak Lewis base catalyst is employed.
8. The process for the manufacture of optically active di-alpha-pinyl-3-hexylborane which comprises reacting optically active di-alpha-pinyl boron hydride with cis-3-hexene at a temperature between about 0 to 100° C.
9. The process for the manufacture of optically active di-alpha-pinyl norbornyl borane which comprises reacting optically active di-alpha-pinyl boron hydride with norbornene at a temperature between about 0 to 100° C.
10. The process for the manufacture of optically active di-alpha-pinyl-3-p-menthylborane which comprises reacting di-alpha-pinyl boron hydride with $\Delta^3$-p-menthene at a temperature between about 0 to 100° C.
11. Optically active di-alpha-pinyl-3-hexylborane.
12. Optically active di-alpha-pinyl norbornylborane.
13. The process for the manufacture of optically active di-alpha-pinyl-sec-butyl borane which comprises reacting optically active di-alpha-pinyl boron hydride with cis-2-butene at a temperature between about 0 to 100° C.
14. The process of claim 13 further characterized in that the reaction is conducted in the presence of the dimethyl ether of diethylene glycol.
15. Optically active di-alpha-pinyl-sec-butyl borane.

References Cited by the Examiner

UNITED STATES PATENTS

| 2,874,165 | 2/1959 | Brown. | |
| 2,886,599 | 5/1959 | Koster | 260—606.5 |
| 2,990,422 | 6/1961 | Woroch et al. | 260—606.5 X |
| 3,010,989 | 11/1961 | Iloff | 260—606.5 |
| 3,016,397 | 1/1962 | Walde | 260—606.5 X |

FOREIGN PATENTS 1,089,384   9/1960   Germany.

OTHER REFERENCES

Braun et al., Tetrahedron Letters (Great Britain), No. 21, pp. 9–11 (1960).

Hurd, Chemistry of the Hydrides, John Wiley and Sons, Inc., New York, 1952, page 88.

Karrer, Organic Chemistry, 4th Ed., pp. 98 to 108 (1950).

Mikhailov et al., Izvest. Akad. Nauk. S.S.S.R. Otdel Khim. Nauk., pp. 1307–9 (July 1960), abstracted in Chem. Abs., vol. 55, page 360 (January 9, 1961).

Torssell, Chem. Abs., vol. 49, pp. 10213–4 (1955) (three articles).

TOBIAS E. LEVOW, *Primary Examiner.*

LEON D. ROSDOL, *Examiner.*

L. A. SEBASTIAN, F. R. OWENS, *Assistant Examiners.*